Jan. 14, 1930.　　　T. R. HARRISON　　　1,743,852
METER
Original Filed Dec. 29, 1925　　2 Sheets-Sheet 1
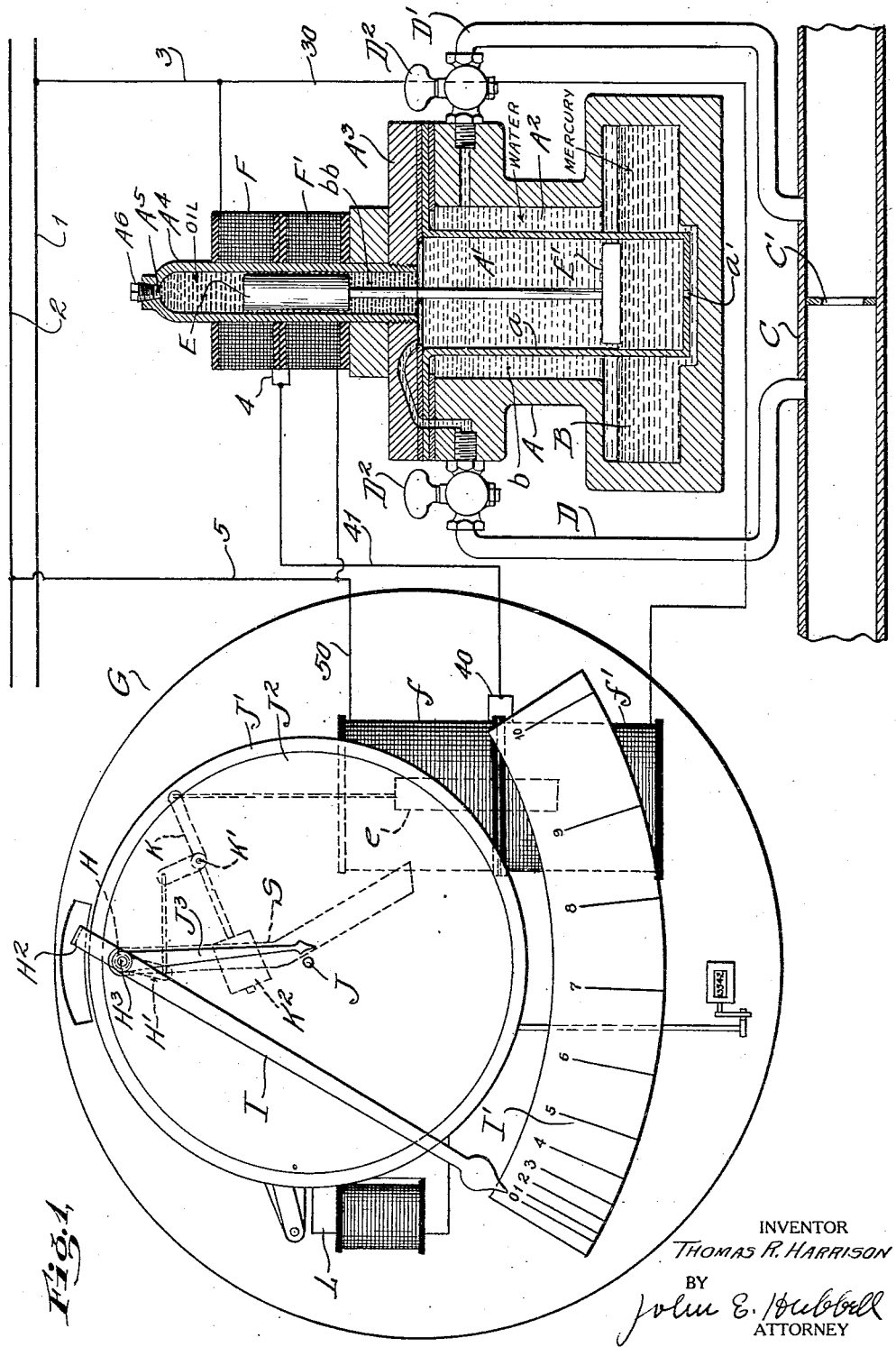
INVENTOR
Thomas R. Harrison
BY
John E. Hubbell
ATTORNEY

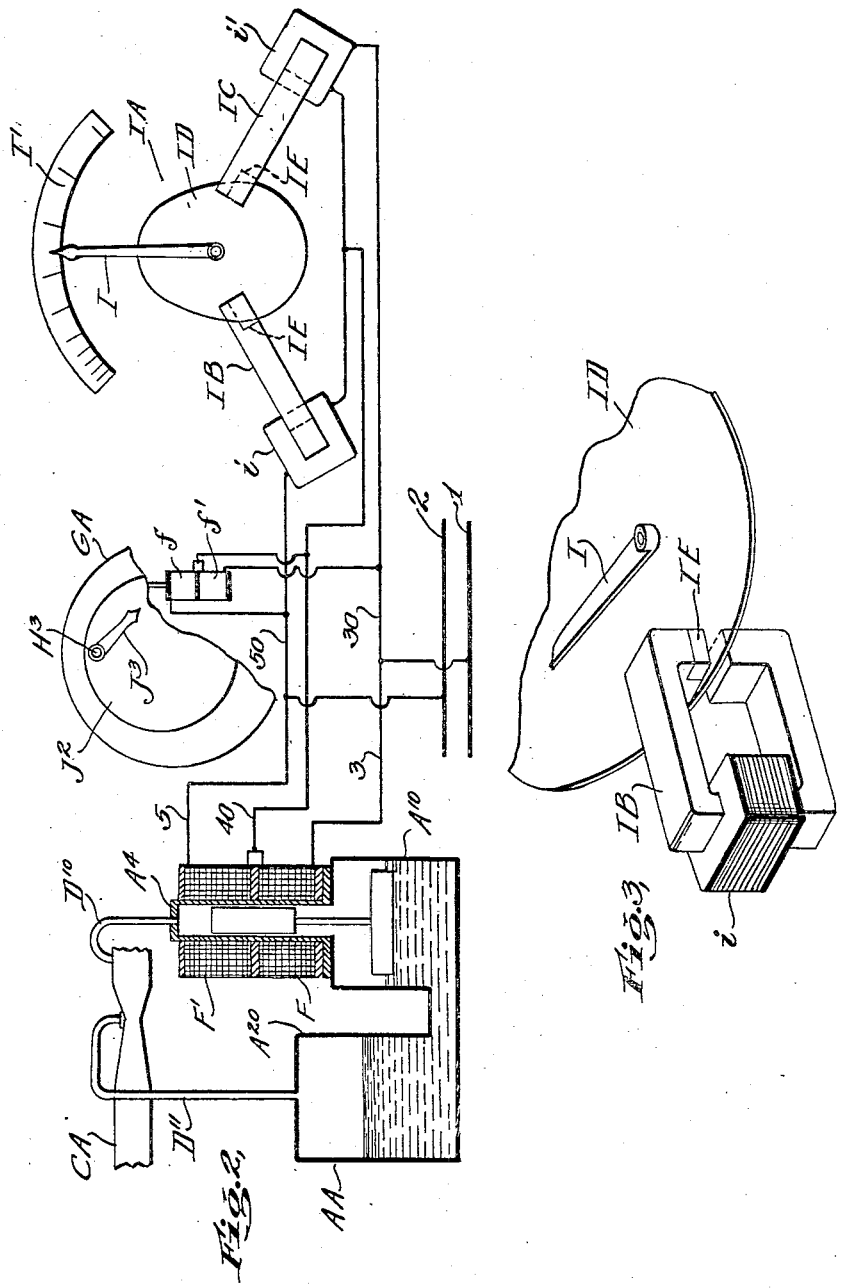

Patented Jan. 14, 1930

1,743,852

UNITED STATES PATENT OFFICE

THOMAS R. HARRISON, OF PHILADELPHIA, PENNSYLVANIA, ASSIGNOR TO THE BROWN INSTRUMENT COMPANY, OF PHILADELPHIA, PENNSYLVANIA, A CORPORATION OF PENNSYLVANIA

METER

Original application filed December 29, 1925, Serial No. 78,148. Divided and this application filed May 3, 1926. Serial No. 106,346.

The general object of the present invention is to provide an improved meter mechanism particularly devised and adapted for determining the rate of flow of fluid through a conduit from a pressure differential which is a function of said rate of flow. A more specific object of the invention is to provide improved electro-magnetic means for moving the movable indicating and/or recording elements of the meter in response to the movements of a part moving in direct response to changes in the pressure differential or other value or quantity measured by the meter. The improved electrical means which I have provided for this purpose are characterized by their mechanical and electrical simplicity and reliability, and their operation moreover, is substantially independent of minor variations in the voltage of the source of energizing current employed, so that such source may be an ordinary alternating current power or lighting circuit, and no current regulator or the like is required to compensate or correct for such voltage fluctuations as ordinarily occur in such a circuit.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described preferred embodiments of my invention.

Of the drawings:

Fig. 1 is a somewhat diagrammatic representation of a flow meter with parts broken away and in section;

Fig. 2 is a diagrammatic representation of a modified construction; and

Fig. 3 is a perspective view of a portion of the apparatus shown in Fig. 2.

My improved instrument in the form shown in the drawings, comprises an indicating, recording and integrating portion collectively designated by the symbol G, and an actuator which is a differential pressure device A, when the instrument, as in the form shown, is intended for measuring fluid rate of flow. The differential pressure device A, as shown, comprises a casing body which may be described as cup-shaped and which has its interior divided into two chambers $A'$ and $A^2$ by a suitable partition wall. The latter, as shown, is formed by a cup-shaped part $a$, of sheet metal comprising a vertically disposed cylindrical body portion which surrounds the chamber $A'$. The part $a$ has an out-turned flange at its open upper end which is clamped against the upper end of the casing body by a clamping head $A^3$, and said flange closes the upper end of the chamber $A^2$ which surrounds and extends beneath the lower end of the chamber $A'$. Advantageously, as shown, the lower portion of chamber $A^2$ is enlarged to hold a sufficiently large quantity of a suitable sealing liquid B. The particular liquid B employed will vary with the conditions of use and for many purposes may well be mercury. The chambers $A'$ and $A^2$ may be in free communication at their lower ends, but as shown they are in communication through a restricted orifice $a'$ formed in the otherwise closed bottom of the member $a$.

In the use of the apparatus to measure the flow of a fluid through a conduit C, the chambers $A'$ and $A^2$ are connected by pipes D and $D'$, respectively, to the conduit C at points thereof between which there is a difference of pressure which is a function of the fluid rate of flow through the conduit. As shown, the pipe D connects the chamber $A'$ to the conduit C at the down-flow or outlet side of a restricted orifice $C'$ in the conduit C, while the pipe $D'$ connects the chamber $A^2$ to the conduit C at the up-flow or inlet side of the orifice $C'$. $D^2$ represents normally open cut off valves in the pipes D and $D'$.

With the described arrangement, as the flow through the conduit C increases, the difference between the pressures transmitted to the chamber $A'$ and $A^2$ of the device A increases approximately in proportion to the square root of the change in velocity or volume of flow through the orifice $C'$. As this pressure difference increases, the sealing liquid is transferred from the chamber $A^2$ to the chamber A′ through the orifice a′, and thereby gives movement to a float E′ resting on the sealing liquid in the chamber A′. The movement of the float E′ thus produced gives corresponding movements to an electro-magnetic core body E supported by the float E′ through a connecting stem part. The core is movably received in and guided by a casing member A⁴ of non-magnetic metal and shown as a tubular part having its upper end closed and having its lower open end secured in an aperture formed for the purpose in the clamping head A³ which with the part A⁴ closes the upper end of the chamber A′.

The indicating recording and integrating section G of the instrument comprises a vertically movable magnetic core e to which the movements of the core E are transmitted by electro-magnetic means. The last mentioned means in the preferred construction illustrated, comprises what I call an impedance bridge which includes two coils F and F′ surrounding the member A⁴ and placed one above the other and so disposed that as the core E is moved up and down by the change in sealing liquid level in the chamber A′, the inductance of the coil F is increased or decreased, respectively, relative to the inductance of the coil F′. The impedance bridge also includes the two coils f and f′ arranged one above the other and surrounding the core e and so connected into the impedance bridge that when the movement of the core E unbalances the impedance bridge by varying the inductance of the coil F relative to that of the coil F′, the electro-magnetic interaction between the core e and the coils f and f′ will move the core e downward or upward accordingly as the movement of the core E is upward or downward, respectively, as required to re-balance the impedance bridge.

To this end the coils F and F′ are connected in series between alternating current supply conductors 1 and 2 as by conductors 3, 4, and 5. The coils f′ and f are similarly connected in series between the conductors 1 and 2 by branches 30 and 50, respectively, from the conductors 3, and 5, and by a conductor 40, and are so relatively wound and connected between the supply conductors 1 and 2 that the two coils are energized in the same direction. By the expression "energized in the same direction" as used above, and as hereinafter used in the claims, I mean that, disregarding the effects of such minor differences in phase as may occur, the magnetic lines of force simultaneously generated by the current flow through the two coils f and f′, pass in the same axial direction through the coil by which they are generated, so that the magnetic poles created at the remote ends of the two coils are of opposite polarity, as are the poles created at the adjacent ends of the coils. The energization in the same direction of the coils F and F′ is desirable but, generally speaking, is less important in the case of those coils than in the case of the receiver coils f and f′.

The conductors 4 and 40 are directly connected by a conductor 41. With this arrangement the coils F and f′ are connected in parallel with one another between the supply conductor 1 and the conductor 41, while the coils F′ and f are connected in parallel with one another between the conductor 41 and supply conductor 2.

With the described circuit connections, when the core E′ moves upward in response to an increase in the rate of flow through the conduit C, the inductance of the coil F is increased and the inductance of the coil F′ is decreased. This results in a decrease in the current flow through the coils F and f and an increase in the current flow through the coils F′ and f′. With the core e balanced against the action of gravity as it should be, the increase of current flow in the coil f′ relative to the current flow in the coil f moves the core e downward until the opposing electro-magnetic interactions between the core e and coils f and f′ are equal to one another in intensity. This condition is reached when the ratio of the inductances of the coils f′ and f becomes equal to the ratio between the inductances of the coils F and F′ and the impedance bridge is thereby rebalanced. Similarly, on any other movement of the core E there is a corresponding movement of the core e which thus moves down and up in proportion to the up and down movements of the core E.

In the use of the apparatus shown as a steam flow meter, the pipe connections D and D′ and the otherwise unoccupied space in the device A, are normally filled with water of condensation b. To prevent oxidation of the core E, the space in the latter not occupied by the core E is advantageously filled with a suitable oil bb which floats on the water b interposed between the mercury B and the oil bb. With the device A thus filled with different liquids, as the pressure differential impressed on the device A varies and the mercury B is thereby displaced water flows into or out of the chamber A² and out of or into the chamber A′ without disturbing the body of oil bb in the tube A⁴. To facilitate the initial charging of the device A, a vent and oil filling opening A⁵ may be provided at the top of the tube A⁴, this opening being closed by a screw plug A⁶ in the normal use of the apparatus.

The indicating recording and integrating section G of the instrument comprises a supporting framework in which is mounted a rock shaft H connected to, and oscillated by the up and down movement of the core e. The connections shown for this purpose comprise a bell crank lever K which is pivotally supported on the instrument framework at K′ and has one arm connected to the core e and has its other arm link-connected to an arm H' carried by the rock shaft H. K² is a counter-weight by which the moving system comprising the core e, rock shaft H, the parts carried by the latter, and the connections between it and the core e, are balanced against the activity of gravity. Mounted in the instrument framework is a rotatable shaft J carrying a disk J' against the front side of which a paper record chart J² is secured. The shaft J is rotated at a constant speed in any usual and suitable manner as by means of the electric clock motor L mounted on the instrument framework and connected to the shaft J by gearing which need not be illustrated and described. At its front end the rock shaft H carries an arm H² bent about the edge of the disk J' and provided in front of the latter with a stud shaft H³, co-axial with the shaft H, and to which is secured a recording arm J³ for tracing a record on the chart J², and an indicating pointer I which moves along a stationary scale I' when the shaft is oscillated. The connection of the recording arm J³ and the pointer I to the shaft H through the co-axial stud shaft H³, facilitate such angular adjustments of the arm and pointer relative to the shaft H as may be necessary in the calibration of the instrument.

With the simple mechanism already described, the variations in the rate of flow through the conduit C are accurately indicated and recorded. Since, as already explained, the rate of flow through the orifice C' is approximately proportional to the square root of the difference between the pressures at the opposite sides of the orifice C', equal increments or decrements in the rate of flow will not produce equal movements of the pointer I and recording arm J³ in different portions of their respective ranges of movement, so that it is necessary for the scale marks I' to be of the general character illustrated with the particular forms of the magnetic cores, the coils, and the chamber A' shown. Those skilled in the art will understand, however, that by suitable changes in the relative shapes of the core parts E and e, the coils F, F', and f and f' or in the shape of the chamber A', equal changes in the rate of flow through the conduit C may be caused to produce the same angular movements of the rock shaft H whether the actual rate of flow through the conduit C is large or small. The electro-magnetic means provided for transmitting the movements of the float E' to the rock shaft H, operate to make the potential drop in the coils F and f' equal to one another and hence to equalize the potential drops in the coils F' and f, and the operation is not affected by such changes in voltage between the supply conductors 1 and 2 as may occur in ordinary power and light circuits.

Advantageously, the meter section G may comprise suitable integrating mechanism, and, as shown, the rock shaft H carries an arm S which forms the measuring element proper of a novel integrating mechanism devised by me. This integrating mechanism need not be illustrated or described in detail herein, however, as its special characteristics form no part of the invention claimed herein, and it is fully described and claimed in my prior application Serial No. 78,148, filed December 29, 1925, of which the present application is a division.

The flow meter disclosed herein possesses important practical advantages. The construction is simple, sturdy, and reliable in operation. Frictional resistance to the movement of its movable parts is reduced to a minimum especially as no movable parts of the mechanism pass through the walls of pressure chambers so that no friction producing stuffing box provisions are required. The total absence of electrical contacts engaging and separating as flow conditions change as well as of stuffing boxes frees the instrument from a tendency of moving parts to stick, which interferes appreciably with the attainment of the desired accuracy and sensitiveness of types of flow meters now in use and avoids all disturbing effects from variable contact resistance. The fixed positions of the impedance bridge coils and the simple straight movements of the magnetic core bodies E and e reduces lost motion and frictional resistance to a negligible minimum, and makes the action of the apparatus very definite and positive and at the same time as sensitive as may be desirable.

The fact that all electrical wires and windings are external to the manometer chamber which may contain water or other materials undesirably effecting the conductors, eliminates a frequent cause of electrical leakage, short circuits, and burned-out windings, in prior instruments in which conductors extend through the manometer walls, and also eliminates the necessity for pressure tight bushings for such conductors required in such prior instruments. The non-magnetic tube A⁴ which is advantageously made of material of relatively high resistance and relatively immune to the corrosive action of water or other material enclosed by it, may readily be made mechanically strong to resist the high internal pressures which are experienced in some uses of the invention. The fact that the tube A⁴ may readily be made of material which is not only non-magnetic but also of high electrical resistance, makes it possible to secure the desired inter-action between the core E and the coils F and F' without magnetic shielding by the tube, and without requiring the longitudinally slitting of the tube or other precautions to prevent undesirably large induced currents in the tube walls.

The coils F and F', f and f', with their connections and the cores E and e constitute a self balancing inductance bridge; i. e., an inductance bridge in which, through the agency of forces inherent in the bridge itself when the latter is operatively energized, the bridge maintains itself in a condition of balance by causing one part to move as a result of, and in correspondence with the movement imparted to another part so as to balance the bridge when the latter is temporarily unbalanced by the movement of said other part. The last mentioned part in the apparatus shown in Fig. 1, is the core E, and the first mentioned part is the core e.

As already explained, the motion imparted to the core body e by the movements of the core E are practically unaffected by such slight variations in the voltage impressed on the impedance circuit as may be expected in ordinary power or light circuit from which the impedance bridge may be energized. The manner in which the indicating pointer I and recording arm J are mounted and arranged avoids all possibilities of one interfering with the other and lends itself to the use of an illuminated scale and recording dial of a broad black pointer so that the instrument indications can be easily read from some distance. Furthermore, the scale I' may be of ample length and still have its numerals vertically disposed to thereby facilitate meter readings from a distance.

Calibration of the meter shown in Fig. 1 is facilitated by an arrangement of the windings F and F', f and f', and cores E and e, so that in the balanced condition of the meter in which there is no current flow through the conductor 41, each core floats, so to speak, so that it may be moved axially of the surrounding coils by a relatively minute force, while any movement of either core unbalances the bridge and causes a current flow through the conductor 41 providing ample force to restore the balance. The two coils of each pair of coils F and F', f and f', and particularly the latter, are spaced apart slightly as by means of a spacer $F^{10}$ which may consist of a ring or rings of insulating material, and in practice may well be formed by the ends of the spools on which the various coils are separately formed. With either core thus floating its tendency to move into a position central of the two surrounding coils substantially counter-balances its tendency to move under the independent action of either coil into a central position thereof.

The invention in its broader aspects, is capable of embodiment in apparatus differing in many of its general features as well as in details from the apparatus disclosed in Fig. 1, and in Figs. 2 and 3 I have illustrated by way of further example, a form of construction differing in numerous respects from that shown in Fig. 1. In Fig. 2 the differential pressure device AA, replacing the device A of the construction first described, comprises a U-shaped container for the mercury or other sealing liquid. The device AA is connected to, and used in measuring the flow through a conduit CA which as shown includes a Venturi section to create the necessary flow measuring pressure differential. The total pressure in the conduit CA is transmitted to the upper end of the tube $A^4$ which forms an upper end extension of the leg $A^{10}$ of the device AA by a pipe $D^{10}$, while a pipe $D^{11}$ transmits the lower pressure at the throat of the Venturi section to the upper end of the leg $A^{20}$ of the device AA. Advantageously when the fluid flowing through the conduit CA is steam the device AA is located below the level of the conduit CA, so that the upper portion of the legs $A^{10}$ and $A^{20}$, the tube $A^4$ and all or the major portions of the pipes $D^{10}$ and $D^{11}$ will be filled with water of condensation, rather than steam. The portion $A^4$ of the device AA is surrounded by coils F and F' as in the construction first described though as shown the coil F' is placed above the coil F.

In Fig. 2, GA represents an instrument which may be identical with the instrument G first described, though as shown it is merely a recording instrument without integrating provisions and without the separate indicating pointer I and co-operating scale I' of the instrument G. The coils f and f' of the instrument GA are connected to the coils F and F' and to the supply conductors 1 and 2 as the similarly designated parts are connected in Fig. 1. Associated with the device AA and instrument GA is an indicating instrument IA comprising a disk ID of aluminum or like conducting material mounted on a shaft which carries an indicating pointer I, cooperating with a scale I'. The disk ID is rotated into positions corresponding to the different rates of flow of the fluid metered by the opposing action on the disk ID of electromagnets IB and IC. The energizing windings i and i' of the electro-magnets IB and IC, respectively, are connected in parallel with the windings f and f' of the instrument GA. The electro-magnets IB and IC have C-shaped cores between the poles of which the plate ID extends. One pole piece of each magnet is bifurcated and has one fork surrounded by a short circuited conductor or shading coil IE.

The cores and shading coils IE of the two electro-magnets IB and IC are so disposed that the alternating current flow through the coil i creates a reaction between the disk ID and the magnet IB tending to rotate the disk in the counterclockwise direction, while the alternate current energization of the coil i' creates an interaction between the magnet IC and the disk ID tending to rotate the disk ID in the clockwise direction. As the fluid flow through the conduit CA increases with a resultant increase in the current flow through the coil $i'$ and a simultaneous decrease in the amount of current flowing through the coil $i$, the disk ID and the pointer I are consequently moved in the clockwise direction. To insure a definite position of equilibrium of the pointer I for given current flows through the coils $i$ and $i'$, the aluminum disk ID is so shaped that the area of the portion of the disk in inductive relation with the core of the magnet IC will diminish relative to the area of the portion of the disk ID in inductive relation with the core of the magnet IB as the disk ID rotates in the clockwise direction and swings the pointer I away from the zero position of the latter. In the condition shown in Fig. 2, in which the core E is in its middle position and the currents in the coils $i$ and $i'$ are equal, the portions of the disk ID between the poles of the two magnets IB and IC are of the same area.

The similar responses of the instruments GA and IA to changes in the fluid flow through the conduit CA illustrates the fact that any suitable form of differential volt meter may be employed as the actuating element of the exhibiting instrument, whether that instrument be a simple indicator like the instrument IA, a simple recorder like the instrument GA, or an indicating, recording and integrating instrument like the instrument G. A characteristic advantage of the type of circuit connections employed is that two or more instruments may have their energizing windings $f, f'$; $i, i'$; etc., connected in parallel without material effect on one another, or on the amount of current flow through the winding F, F' of the differential pressure device. This facilitates the location in different positions of a plurality of different exhibiting instruments responsive to the same differential pressure device.

Certain novel characteristics of the manometer and immediately associated parts disclosed but not claimed herein are claimed in my copending application Serial No. 128,466, filed August 10, 1926, and in my copending application Serial No. 218,688, filed September 10, 1927 as a division of said application Serial No. 128,466.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent, is:

1. In a flow meter, the combination of a differential pressure device including a body of magnetic material adjusted to different positions by different pressure differentials impressed on said device, means including a second movable body of magnetic material exhibiting different rates of flow according to the different positions of said second body, means comprising a self balancing impedance bridge including a separate pair of stationary coils in inductive relation with each of said magnetic bodies and means for connecting the two coils of each pair to a source of alternating current in such manner relative to the direction of coil winding that said two coils induce magnetic flow in the same direction through the said body in inductive relation therewith for causing the movements of the first mentioned body to produce corresponding movements of said second body.

2. In a flow meter, the combination of a differential pressure device including a body of magnetic material adjusted to different positions by different pressure differentials impressed on said device, means including a second movable body of magnetic material exhibiting different rates of flow according to the different positions of the said second body, and means comprising an impedance bridge including a pair of end to end coils in which the first mentioned magnetic body is axially movable, and a second pair of end to end coils energized in the same direction in which said second body is axially movable for causing the movements of the first mentioned body to produce corresponding movements of said second body.

3. In a flow meter, the combination of a differential pressure device including a body of magnetic material, a pair of end to end coils in which said body is axially movable in response to variations in the differential pressure impressed upon said device and thereby varies the relative inductances of said coils, a second pair of end to end coils, a second body of magnetic material axially movable in the last mentioned coils in response to changes in the electric flows therein, exhibiting mechanism operated by said second body, means connecting the two coils of each end to end pair in series with each other and in parallel with the other two coils to a source of alternating current so as to energize the two coils of the second pair in the same direction and a cross connection between the adjacent ends of the two coils of each pair and the corresponding ends of the other two coils.

4. In combination, an inductive electrical winding comprised of two parts connected in series to a source of alternating current, a body of high magnetic permeability movable to different positions with respect to said winding in accordance with changes in a quantity to be measured, in such manner as to thereby vary the relative values of the inductances of the two parts of said winding and correspondingly vary the relative potential drop in said winding parts, and a differential voltmeter comprising two coils, one connected across each of said winding parts and a movable element adjusted to different positions by changes in the relative voltages impressed on said coils.

5. In a meter, a pair of end to end coils, a magnetic body adapted to be moved axially of said coils and thereby vary the inductances of the two coils in opposite directions on changes in the value of the quantity metered, exhibiting mechanism comprising a pair of end to end coils, a magnetic body movable axially of the last mentioned coils in response to changes in the relative forces with which the two last mentioned coils act upon the last mentioned magnetic body, means connecting the two coils of each end to end pair in series with one another and in parallel with the other two coils to a source of alternating current so as to energize the two coils of each pair in the same direction, and a cross connection between the adjacent ends of the two coils of each pair and the corresponding ends of the other two coils.

6. In a flow meter, the combination with a differential pressure device comprising a casing, and magnetic material within said casing adjusted to different positions by changes in the pressure differential impressed on said device, a pair of windings external to said casing and in inductive relation with said material and having their inductances relatively varied by changes in adjustment of said material, means adapted to connect said windings in series with one another to a source of alternating current, and electro-magnetic means for indicating changes in adjustment of said material comprising two windings, one having its terminals connected to the terminals of one, and the other having its terminals connected to the terminals of the second of the two first mentioned windings.

7. The combination with movable magnetic material, of a pair of windings in inductive relation with said material and having their inductances relatively varied by changes in position of said material, means adapted to connect said windings in series with one another to a source of alternating current, and electro-magnetic means for indicating changes in adjustment of said material comprising two coils in end to end relation and slightly spaced apart, one having its terminals connected to the terminals of one, and the other having its terminals connected to the terminals of the second of the two first mentioned windings so that both coils induce magnetic flow in the same axial direction at any one instant, and a body of magnetic material movable axially in said coils.

8. The combination with magnetic material movable into different positions, of a pair of windings in inductive relation with said material and having their inductances relatively varied by changes in position of said material, means adapted to connect said windings in series with one another to a source of alternating current, and electromagnetic means for indicating changes in positions of said material comprising two coils in end to end relation with one another, one having its terminals connected to the terminals of one, and the other having its terminals connected to the terminals of the second of the two first mentioned windings, so that both coils induce magnetic flow in the same axial direction at any one instant, and a body of magnetic material movable axially in said coils, said coils and body being so relatively arranged that said body tends to assume a position which varies with the position of the first mentioned magnetic material, and from which it may be displaced by a relatively small force, and as a result of any such displacement creates a relatively large force tending to move it back toward the first mentioned position of said body.

9. In a flow meter, the combination of a differential pressure device including magnetic material adjusted to different positions by different pressure differentials impressed on said device, a winding in inductive relation with said material and comprising two parts, the relative inductances of which are varied by the position of said material and a second winding comprising two parts in axial alignment connected to the first mentioned winding, both windings being connected to a source of alternating current in such manner relative to the direction of coil winding that both parts of the second mentioned winding induce magnetic flow in the same direction at any instant.

Signed at Philadelphia, in the county of Philadelphia and State of Pennsylvania, this 1st day of May, A. D. 1926.

THOMAS R. HARRISON.